March 3, 1970  C. J. STALEGO  3,498,805
OPALESCENT GLASS FIBERS

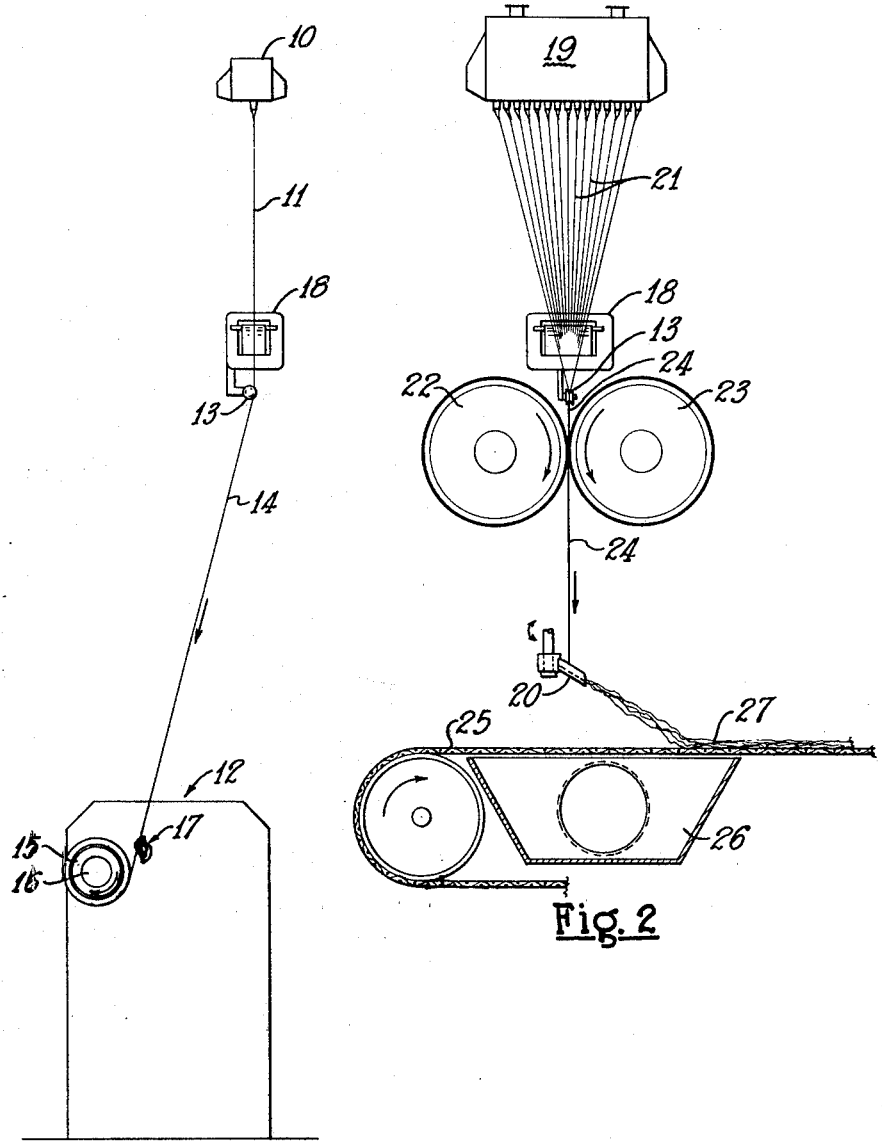

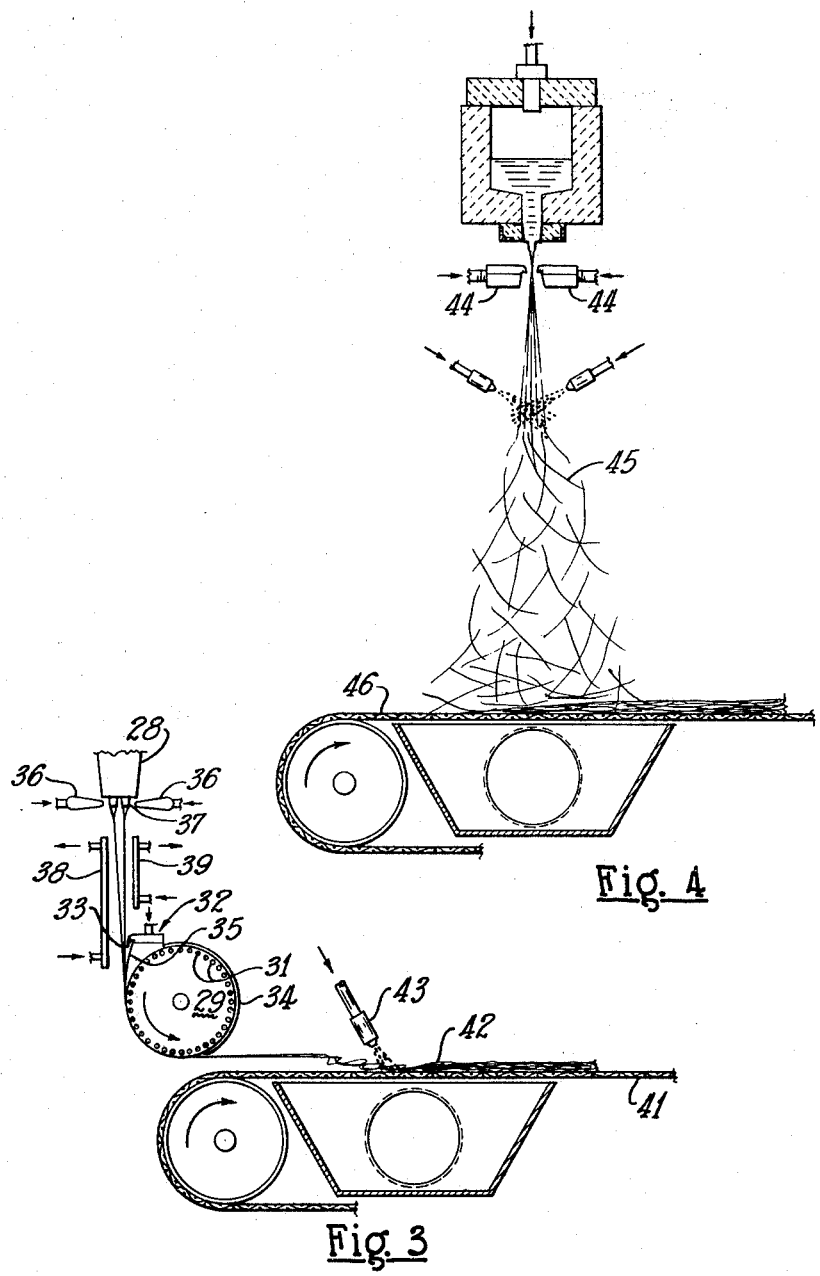

Filed June 5, 1968  3 Sheets-Sheet 3

INVENTOR
CHARLES J. STALEGO
BY
ATTORNEYS

United States Patent Office 3,498,805
Patented Mar. 3, 1970

3,498,805
OPALESCENT GLASS FIBERS
Charles J. Stalego, Newark, Ohio, assignor to Owens-Corning Fiberglas Corporation, a corporation of Delaware
Continuation-in-part of application Ser. No. 272,062, Apr. 10, 1963. This application June 5, 1968, Ser. No. 734,647
Int. Cl. C03b 37/00; C03c 3/00
U.S. Cl. 106—50                              2 Claims

ABSTRACT OF THE DISCLOSURE

Opalescent alkaline earth metal borosilicate glass fibers consisting of two immiscible glass phases including a glass matrix, and dispersed throughout said matrix globules varying in diameter from 1–7% of the fiber diameter.

---

Figure 5:
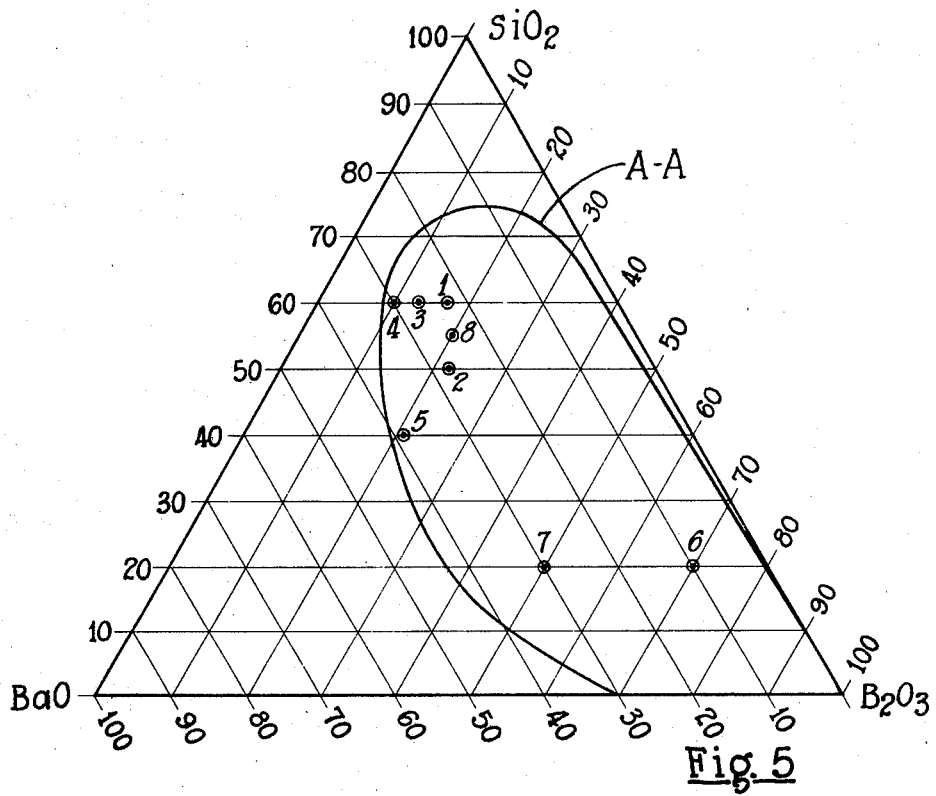

This application is a continuation-in-part of my co-pending application Ser. No. 272,062, filed Apr. 10, 1963, now U.S. Patent 3,413,133.

This invention relates to opal glass and to methods of preparing compositions which are opalescent and capable of being fabricated into various forms including massive forms, particles, flakes, and fibers, and particularly fibers.

Opal glass and other forms of inorganic substances which appear like opal have been known for some time; however, immiscible glasses formerly have been regarded as of little or no value. Immiscibility in a glass has been conventionally regarded as undesirable and to be averted in the production of particulate glass such as glass fibers.

Opal-glass is prepared by forming a plurality of globules of a glassy phase within a matrix of another glassy phase to form a resultant two-phase material having the characteristic milky appearance of opal.

The relative size of the globules and the fibers may vary widely. Generally, it is preferred to have very small diameter globules which are much smaller than the fiber diameter. It is better to have ten or even fifty particles or globules arranged across the cross-section of a fiber. The matrix should be more viscous than the dispersed, immiscible phase. Silica can be added to increase viscosity where such change is desirable. It has been found desirable to produce many small globules within a matrix to obtain a uniform, high-strength structure. The propagation of cracks in a glass structure by mechanical or thermal shock is effectively prevented by the presence of the globules within the matrix. A crack which travels through the matrix is stopped at the interface between a globule and the matrix. In addition to the novel appearance achieved, these immiscible glass systems can be designed to retain the durability and strength properties of the stronger of the two glasses to which they are most closely related.

It is an object of this invention to provide compositions which can be utilized to form opal fibers from a melt.

It is a further object to provide a process for producing continuous opal fibers.

It is also an object to control immiscibility of a glass which is being formed from a melt thereby imparting unusual and improved strength properties to the glass.

Further objects will be apparent from the description of the compositions and method of forming them that follows.

It has been discovered that opal glass can be prepared utilizing a number of glass systems. For instance, alkaline earth oxide systems have been found satisfactory for the purposes of the invention. Glasses comprising silica, boric oxide and an oxide of at least one Group II element represent systems that can be used. Alkaline earth oxides, including those of magnesium, calcium, strontium and barium, may be used. $BaO\text{---}SiO_2\text{---}B_2O_3$, $$CaO\text{---}SiO_2\text{---}B_2O_3$$

$MgO\text{---}SiO_2\text{---}B_2O_3$ and $SrO\text{---}SiO_2\text{---}B_2O_3$ or combinations of these systems may be used satisfactorily. In these systems, $SiO_2$ promotes formability in the glass and $B_2O_3$ and the alkaline earth oxide promote formation of an immiscible phase. $B_2O_3$ and $SiO_2$ combinations may also form immiscible systems with BeO, ZnO, CdO and HgO.

Immiscible glass systems also include $CaO\text{---}SiO_2$, $MgO\text{---}SiO_2$, $SrO\text{---}SiO_2$, and $ZnO\text{---}SiO_2$, wherein a Group II element oxide is combined with only $SiO_2$. Oxides of Hg, Ra, Cd, Ba and Be may be used instead of CaO. Oxides of metals having a valence of two, such as FeO and MnO, form immiscible phase systems with silica. The substitution of $B_2O_3$ for silica in these systems also results in immiscible glasses.

Oxides such as those of phosphorus, germanium, vanadium and arsenic when substituted for the glass-forming oxides such as silica with or without $B_2O_3$ will apparently encourage immiscibility in glass systems.

Combining non-glass-formers in glass systems tends to increase the field of immicibility of those systems. For instance, the combination of CaO—BaO, BaO—Mgo, MgO—SrO, SrO—CaO, etc., in the compositions of this invention, promotes immiscibility.

The following examples represent immiscible systems:

$CaO\text{---}BaO\text{---}B_2O_3\text{---}SiO_2$       $BaO\text{---}ZnO\text{---}B_2O_3\text{---}SiO_2$
$BaO\text{---}MgO\text{---}B_2O_3\text{---}SiO_2$     $BaO\text{---}SrO\text{---}B_2O_3\text{---}SiO_2$
$MgO\text{---}SrO\text{---}B_2O_3\text{---}SiO_2$     $BaO\text{---}CaO\text{---}B_2O_3\text{---}SiO_2$
$SrO\text{---}CaO\text{---}B_2O_3\text{---}SiO_2$     $CaO\text{---}MgO\text{---}B_2O_3\text{---}SiO_2$ Immiscibility can be reduced by addition of materials such as $Li_2O$, $Na_2O$, $K_2O$, $Ag_2O$, $Al_2O_3$, and PbO to any immiscible system including systems comprising a Group II oxide, $B_2O_3$ and $SiO_2$. Opalescence can be controlled by addition of such materials in proportions of 1%, 2% or up to 15% by weight. These additions will reduce opalescence or make the resultant glasses become clear. The immiscibility of a $CaO\text{---}MgO\text{---}B_2O_3\text{---}SiO_2$ system has been controlled by additions of $Al_2O_3$, or $Na_2O$ or combinations of these two. Control of opalescence by reduction of the immiscibility is therefore contemplated. Extreme opalescence is generally accompanied by brittleness, weakness and flatness in color while low level opacity is accompanied by high gloss and brilliance.

The proportion of modifying oxides added to immiscible glasses may be varied to adjust the temperature-viscosity relationship of a melt so that fibers can be formed. Modifying oxides are not essential but are preferably added to promote, enhance and/or control opalescence in the resulting glasses. The addition of a modifying oxide to a glass composition may result in the formation of an opal glass with an attendant desirable change in the temperature-viscosity relationship of the melt. Oxides of Groups I and III elements of the Periodic Table are considered useful modifiers for the contemplated glass systems. In addition, certain other oxides of other groups such as those of Sb, Bi, Hg, and Pb are considered to be useful modifiers.

It has been found that opal glass fibers can be formed from glass melts of the compositions disclosed above by controlling the size of the globules dispersed in the matrix. Specifically the diameter of the globules should not exceed 7% of the diameter of the fiber itself (which is defined by the matrix phase). In Examples 1–8 below the fiber diameter was shown by microphotographs to be 6–7 microns. These same photographs indicated that opalescence was attained when the globule diameter did not exceed 0.50 micron, and optimum opalescent effect was attained in the glass compositions disclosed when the globule diameter was from 0.10 to 0.25 micron. In other words, opalescent fibers may be produced by maintaining the globule diameter between 1–7% of the fiber (or matrix) diameter and preferably from 1–4% of fiber diameter.

It has also been found that opalescent fibers can be produced with diameters from 4–15 micron if the globule size is maintained at 1–7% of the fiber diameter. It should also be noted, however, that fibers having a diameter in excess of 15 microns would have globules of increasing size. As globule sizes increase, it becomes more and more difficult, if not impossible, to avoid breakage of the fibers and therefore continuously pull the fibers. Fiber breakage also becomes a problem when the viscosities of the immiscible glass phases become more and more dissimilar. This is one of the reasons that the disclosed glass compositions are suitable for forming opalescent fibers; that is, they assure a reasonably similar viscosity relation between the glass phases which enhances the ability of the melt to be fiberized continuously.

The importance of globule sizes is made apparent when attempting to form fibers from a melt wherein the globules are larger than 7% of the fiber diameter. In these cases, when fibers are formed from the melt, a portion of the matrix is pulled from the melt, then one or more globules (with no surrounding matrix), then more matrix, and so on. The end result is a continuous fiber having sections of the matrix phase and sections of the globule phase but no globules dispersed in the matrix. A fiber of this construction will be clear and devoid of any opalescence. However, by maintaining the globule diameter within 1–7% of the fiber diameter, the globules will remain dispersed in the matrix during fiber forming and the resulting fiber will be opalescent.

The proper globule size may be maintained by providing one of the glass compositions disclosed above, melting the batch ingredients as quickly as possible (e.g., by flash melting) and then forming fibers by pulling them from the melt within certain time intervals after the glass ingredients reach their melting point.

Generally, the preferred globule size and therefore opalescence can be attained by pulling fibers from the melt within 0.10 seconds to 4 minutes after the melting point of the batch ingredients is reached. Preferably this time interval should be from 25 seconds to 4 minutes after melting in order to obtain optimum opalescence. As the time interval increases from 4 minutes up to about 20 minutes, the opalescence of the fibers gradually decreases with a complete lack of opalescence after 20 minutes.

It is believed that reduction in opalescence as time after melting increases is due to the tendency of individual globules of desired size to coalesce and form globules of less desirable size, i.e., greater than 7% of fiber diameter. As indicated above these larger globule sizes prevent the required dispersion of globules in the matrix.

Since it is necessary to pull fibers from the glass melt within about 4 minutes and not longer than 20 minutes after melting is attained, it is very desirable to use a batch feeder or paramelt type feeder for melting the glass batch ingredients; a description of this apparatus is contained in U.S. Patent No. 3,264,076. The batch feeder arrangement allows succeeding layers of batch ingredients to be laid on the molten glass in the feeder at intervals timed to coincide with a fiber pulling rate which assures that the glass is formed into fibers within 0.10 second to 20 minutes after melting.

EXAMPLE 1

High strength, immiscible glass fibers have been formed of a melt comprising 60% $SiO_2$, 22% BaO and 18% $B_2O_3$. These fibers were pulled from a melt maintained at a temperature of about 2750° F. Spherical immiscible bodies of silica coalesce upon being heated to form short but continuous silica networks throughout the glass but it is not essential that the fibers be heat-treated in order to achieve opalescence. However, heat-treatment with resulting network structure will result in an opal glass having thermal and mechanical shock resistance at even greater temperatures. During fiberization the silica-rich globules tend to become elongated and to orient themselves parallel to their longest axis.

EXAMPLE 2

A suitable composition which can be fiberized from a melt comprises 50% $SiO_2$ 27.5% BaO and 22.5% $B_2O_3$. This composition can be melted at a temperature of 2700° F. and fiberized at a temperature of 2490° F.

EXAMPLE 3

A composition, which was melted at 2800° F. and fiberized at 2725° F. utilizing a collet winder, comprises 60% $SiO_2$, 26% BaO and 14% $B_2O_3$.

EXAMPLE 4

Another composition suitable for the purposes of the invention comprises 60% $SiO_2$, 30% BaO and 10% $BO_3$. This glass was melted at 2850° F. and fiberized at 2750° F. to form opal fibers.

EXAMPLE 5

An opal glass was formed from the following composition which comprises 40% $SiO_2$, 39% BaO and 21% $B_2O_3$. This glass was melted at 2370° F.

EXAMPLE 6

A composition suitable for the production of opal fibers comprises 20% $SiO_2$, 70% $B_2O_3$ and 10% BaO.

EXAMPLE 7

Still another composition comprises 20% $SiO_2$, 50% $B_2O_3$ and 30% BaO.

EXAMPLE 8

A preferred composition comprises 55% $SiO_2$, 20% $B_2O_3$ and 25% BaO.

In Examples 1–8 the fibers were formed within 4 minutes after the melting point of the glass composition was reached.

In these compositions, the matrix is rich in barium and the globules rich in boron and silicon. The degree of opacity is a function of the amount and distribution of silica-rich phase exsolving from the melt.

It has been found that a textile glass composition comprising about 54% $SiO_2$, 14% $Al_2O_3$, 22% CaO, and 10% $B_2O_3$ can be changed to an opal glass by reducing the $Al_2O_3$ content to a value less than 9%. When this composition is changed so that the $Al_2O_3$ is present in proportions of from 3–9% with the difference being an increase in $SiO_2$, the compositions become opal.

Reduction of $Al_2O_3$ content may result in compositions which are opalescent massive or bulk glass that become clear if fiberized. If the $Al_2O_3$ content is greater than 8%, the resulting composition is opal in bulk form and clear in fiber form. With lower percentages of $Al_2O_3$, the bulk and fibrous forms are both opalescent with opalescence increasing with reduction of $Al_2O_3$ content. Low alumina compositions of this type are immiscible systems in which crystals appear in both the matrix and the immiscible globules, the crystals apparently comprising $Al_2O_3$, $CaSiO_2$ and $SiO_2$. The crystals tend to form at the interfaces between the globules and matrix. An E glass system having all $Al_2O_3$ deleted and an addition of from about 1.5% to 4.25% of $Na_2O$ to make the glass formable is an immiscible system.

These compositions are fiberized by utilizing apparatus such as that shown in FIGURE 1, wherein molten glass emits from feeder 10 in one or multiple streams of molten glass which are attenuated into fibers 11 by the pulling action of winder 12. The fibers 11 are gathered together on gathering wheel 13 to form a strand 14 which is wrapped upon a collet 15 as the spindle 16 of the winder 12 rotates. A suitable package is formed upon a tube on the collet by the action of the wire-traverse mechanism 17 and rotation of the collet. A suitable surface treatment is applied to the fibers by roll or apron applicator 18.

In FIGURE 2, another apparatus for forming fibers from the illustrated compositions is shown. Here a plurality of streams of molten glass emit from feeder 19 and are attenuated into fibers 21, 21 by the pulling action of a pair of pull wheels 22, 23. The fibers are gathered into a strand 24 prior to passing into the bite of the pull wheels. The strand passes downwardly, hits oscillating deflector 20, and is collected upon conveyor belt 25. A suction box 26 is provided under the woven belt to promote the deposition of the strand on the conveyor. An apron applicator 18 is utilized for gathering the fibers into a strand and for applying a suitable surface treatment to the fibers as they are formed and gathered. The product is an accumulation of fibers in the form of a mat 27.

In FIGURE 3, an apparatus for forming continuous fibers is shown. Molten glass flows from feeder 28. The pulling drum 29 comprises end discs and a plurality of closely spaced rods 31 which form the periphery of the drum. Air is introduced into blower 32 which in turn directs air from nozzle 33 downwardly to advance the fibers toward the pulling drum. Shroud 34, which surrounds pulling drum 29, and apron 35 suspended from nozzle 33 help control the flow of air and advancement of the fibers. Tip coolers 36 are utilized to control the temperature of the tips 37 and the temperature of the molten glass emitting from the tips. The tip coolers and the cooling aprons 38, 39 are optional and used if needed. The liquid introduced may be cooled or heated as required.

Fibers 42 produced on this apparatus are collected on conveyer 41 in the form of a mat. A transparent or white binder such as gelatine is applied with a spray device 43 as the fibers are collected.

The attenuating force for forming fibers of the melts disclosed may be an air or steam blast. A pair of steam blowers 44, 44 direct a blast of steam downwardly to attenuate streams of glass into discontinuous fibers 45 that are treated with a binder and collected on conveyor 46, see FIGURE 4.

FIGURE 5 of the drawings is a ternary diagram of the $SiO_2$—$BaO$—$B_2O_3$ system which sets forth opal glass compositions that lie within curved line A—A. Some of the examples disclosed above are indicated on this diagram. Examples 1, 5 and 8 are deemed to be preferred compositions. Suitable compositions comprise about 10-75% $SiO_2$, 5-80% $B_2O_3$, and 6-45% $BaO$, and preferably about 20-60% $SiO_2$, 10-70% $B_2O_3$, and 10-40% $BaO$.

Figure 6:
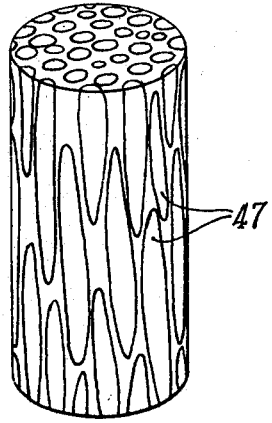

Photomicrographs of massive forms of opal glass indicate that fibers will appear as shown in FIGURE 6 if properly etched and magnified. Extended globules 47 of the immiscible phase are aligned within the opal fiber to provide a novel structure that lends thermal shock resistance and mechanical shock resistance. The globules may be about one-fiftieth the size of the fiber in cross section. At least a portion of the globules may remain more nearly spherical in drawn fibers. Elongated globules are more likely to be formed in very small diameter fibers. Spherical globules segregate from the melt and arrange themselves throughout the matrix which becomes a three-dimensional network which separates adjacent globules one from the other.

Although specific compositions have been set forth, the invention is not limited to these compositions. The invention is not limited to three component, immiscible glass systems. Two, four and eight component systems have been successfully used. Various glasses can be used including those that may be clear until modifiers such as $Al_2O_3$, $Na_2O$, $BaO$, or other oxides or metal salts are added or proportions reduced if the oxide is an ingredient of the glass being modified and then formed into fibers. Modifiers may be added to adjust the temperature-viscosity relationship of the melt and to promote and facilitate fiberizability. An excess of modifier may result in a miscible glass whereas a proper addition of modifier results in an immiscible glass being formed. From about 0.01% to about 0.02% of a precious metal halide, such as platinum chloride which is decomposable by the application of heat, may be added to achieve an immiscible glass system. It has been found that precious metal halides will cause normally clear compositions to become opal.

Opal glass is produced by creating immiscibility, by causing devitrification, by forming bubbles in the glass or by combinations of these. Immiscible systems have been found entirely satisfactory. The formation of crystals at the interfaces between globules and matrix of an immiscible system enhances the opalescent effect and also provides satisfactory results. Crystals may form in one or both phases of the system and/or at the interface of globule and matrix. These glass compositions can have from about 1-4% of an inorganic coloring oxide added. Opalescence enhances the coloring effect of the oxide added. The same amount of coloring oxide added to a clear or non-opal glass will produce less color effect than that added to an opal glass. This is an additional advantage of opal glasses, i.e., deeper shades and more attractive colors are produced. Strontium oxide, nickel chloride, cadmium chloride, cobalt chloride, chromium acetate, cerium oxide, potassium permanganate, potassium dichromate, potassium dichromate and lead oxide, potassium dichromate and copper oxide, sodium uranate, sodium borate and ammonium phosphate and copper oxide, and others can be used to achieve novel appearance.

Natural occurring materials can be utilized as starting materials for forming opal glass. Danburite ($CaO \cdot B_2O_3 \cdot 2SiO_2$) is combined with up to 40% $SiO_2$, up to 33% $B_2O_3$ and up to 15% $Al_2O_3$ in an opal glass system. Calcium borosilicate can be added to silica and $B_2O_3$ in various proportions to produce the desired effect. A 45:30:25 mixture of calcium borosilicate-$SiO_2$—$B_2O_3$ can be used and has been found to be easily fiberizable. Other silicates can be used as the starting material for these compositions; spodumene, albite, beryl, andradite and others are examples of such minerals.

Nucleating agents such as $Al_2O_3$, $TiO_2$, $PtCl_4$, $CuO$ or $ZrO_2$ can be added in small proportions less than 2% to promote crystal growth and opal glass. As stated before, opacity can be eliminated or reduced by sufficient additions of other oxides such as $Na_2O$, $Al_2O_3$ or $Li_2O$; therefore, this is a way to control opacity.

Opal glass can be formed by adding from about 20-50% by weight of precipitated $Al(OH)_3$ to a glass batch as the source of $Al_2O_3$. This finely divided form of aluminum promotes ease of melting and contributes toward production of opalescene in the resulting glass.

Clear fibers formed of the composition of albite ($Na_2O \cdot Al_2O_3 \cdot 6SiO_2$) were heated to 1150° F. for one-half hour to form opal fibers. This illustrates the after-treatment of fibers to produce opalescence. The flexural modulus of these fibers increases after heating.

In the immiscible systems, an increase in $SiO_2$ content facilitates formability, an increase in $BaO$ or other opacifying oxide tends to increase opacity if used in proper proportions, and an increase in $B_2O_3$ increases opacity but an excess of $B_2O_3$ decreases the viscosity of the melt with resultant coalescence of the globules which may stop fiber formation.

Development of crystallites in the immiscible phase systems improves the thermal and mechanical shock resistance. Ceramic or metallic particles can be added to the glasses to enhance physical properties.

Another advantage of opacity in glass involves color masking. If inorganic color is added in sufficient quantity as set forth before, the opal glass enhances the color effect; however, if a trace of color is inherent in the glass because of the presence of impurities such as chromium or iron, the opalescence will hide or mask the undesirable trace of color.

These opal fibers have various uses. They can be used as surfacing mats in the fabrication of reinforced plastics. They can be used in textile products as decorative yarns or fabrics. Opal fibers are properly used as a reinforcement for plastic light panels wherein they diffuse the light and contribute toward hiding of fluorescent tubes or bulbs in the fixture. They provide an attractive appearance and at the same time are functional. The fibers exhibit high modulus and thermal shock resistance and are useful in any application where these properties are beneficial.

Various treatments may be applied to the opal fibers. Silanes such as diphenyl di-n-dodecyl silane, diphenyl bis-n-dodecyl silane and others may be applied to the fibers as a size or as an after-treatment. Hexaphenylditin solution, dimethyl tin oxide solution, organic oils or solutions of or molten forms of resins may be applied as the fibers are formed or as an after-treatment. These treatments can have various pigments, such as $TiO_2$ for whiteness, included in their make-up.

White surface coatings can be produced to enhance the opalescence by forming oxides or hydroxides of Al, Ta, Sc, Se, Ti, Zn, or Sn on the surfaces of fibers. Hydroxide coatings can be formed by application of a salt followed by exposure to $NH_3$.

What is claimed is:
1. Opalescent glass fibers formed from a melt consisting essentially of, by weight, 20–60% $SiO_2$, 10–70% $B_2O_3$ and a sufficient amount of at least one alkaline earth metal oxide to promote immiscibility;
    said fibers further consisting essentially of two immiscible glass phases including a glass matrix, and dispersed throughout said matrix, globules of an immiscible phase;
    said globules ranging in diameter from 1–7% of the diameter of said glass fibers.
2. The opalescent glass fibers of claim 1 wherein said amount of alkaline earth metal oxide is 10–40% BaO.

References Cited

UNITED STATES PATENTS 3,413,133  11/1968  Stalego.

HELEN M. McCARTHY, Primary Examiner

U.S. Cl. X.R.

65—2; 106—54; 161—177